(12) United States Patent
Akiyama

(10) Patent No.: US 10,190,944 B2
(45) Date of Patent: Jan. 29, 2019

(54) DYNAMOMETER-SYSTEM DYNAMO CONTROL DEVICE AND ENGINE STARTING METHOD THEREFOR

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/774,835

(22) PCT Filed: Nov. 2, 2016

(86) PCT No.: PCT/JP2016/082644
§ 371 (c)(1),
(2) Date: May 9, 2018

(87) PCT Pub. No.: WO2017/082143
PCT Pub. Date: May 18, 2017

(65) Prior Publication Data
US 2018/0328815 A1 Nov. 15, 2018

(30) Foreign Application Priority Data
Nov. 9, 2015 (JP) .................................. 2015-219502

(51) Int. Cl.
*G01M 15/02* (2006.01)
*G01L 3/24* (2006.01)
(Continued)

(52) U.S. Cl.
CPC ............. *G01M 15/02* (2013.01); *G01L 3/242* (2013.01); *G01M 15/044* (2013.01); *G01M 15/05* (2013.01); *G01L 3/14* (2013.01)

(58) Field of Classification Search
CPC .... G01M 15/02; G01M 15/044; G01M 15/04; G01M 15/05; G01L 3/14; G01L 3/242
See application file for complete search history.

(56) References Cited

U.S. PATENT DOCUMENTS 6,768,940 B2 * 7/2004 Akiyama ............ G01M 15/044
701/114
8,006,548 B2 * 8/2011 Akiyama ............... G01M 15/02
73/116.05

(Continued)

FOREIGN PATENT DOCUMENTS

JP      2003 149085 A     5/2003
JP      2008 145354 A     6/2008

(Continued)

OTHER PUBLICATIONS

Notice of Reasons for Rejection issued to JP Application No. 2015-219502, dated Jan. 24, 2017, 1 page.

*Primary Examiner* — Freddie Kirkland, III
(74) *Attorney, Agent, or Firm* — Muncy, Geissler, Olds & Lowe, P.C.

(57) ABSTRACT

Provided is a dynamometer-system dynamo control device that can appropriately suppress the occurrence of resonance phenomena and can realize a no-load state, even in a case where an engine the inertia of which is unknown is connected. The dynamometer system comprises a dynamometer and a shaft torque meter. A dynamo control device 6 in the dynamometer system generates a torque current command signal on the basis of a torque detection signal and a torque command signal. The dynamo control device 6 comprises: a gain calculation unit 62 that multiplies the difference between the torque command signal and the torque detection signal by gain wATR and then by Ki; an integration operation unit 63 that integrates the output signal of the gain calculation unit 62; a high-pass filter 64 characterized by a (Continued)

response frequency wHPF; and a torque current command signal generation unit 65 that generates a torque current command signal by superimposing, onto the output signal of the integration operation unit 63, an output signal obtained by inputting the torque detection signal to the high-pass filter 64.

9 Claims, 8 Drawing Sheets

(51) Int. Cl.
    *G01M 15/05*    (2006.01)
    *G01M 15/04*    (2006.01)
    *G01L 3/14*        (2006.01)

(56) References Cited

U.S. PATENT DOCUMENTS

| | | | |
|---|---|---|---|
| 9,116,062 B2 * | 8/2015 | Akiyama | G01L 3/24 |
| 9,400,231 B2 * | 7/2016 | Akiyama | G01M 15/04 |
| 9,689,774 B2 * | 6/2017 | Kanke | G01M 15/044 |
| 9,739,687 B2 * | 8/2017 | Akiyama | G01M 15/02 |
| 10,041,858 B2 * | 8/2018 | Akiyama | G01M 15/04 |
| 2003/0088345 A1 | 5/2003 | Akiyama et al. | |
| 2010/0251811 A1 | 10/2010 | Akiyama et al. | |
| 2016/0084735 A1 | 3/2016 | Akiyama et al. | |
| 2016/0252428 A1 | 9/2016 | Akiyama et al. | |

FOREIGN PATENT DOCUMENTS

| | | |
|---|---|---|
| JP | 2009 133714 A | 6/2009 |
| JP | 5605127 B2 | 10/2014 |
| JP | 2014 224722 A | 12/2014 |
| JP | 2015 075361 A | 4/2015 |

* cited by examiner

DYNAMOMETER-SYSTEM DYNAMO CONTROL DEVICE AND ENGINE STARTING METHOD THEREFOR

TECHNICAL FIELD

The present invention relates to a dynamo control device of a dynamometer system and a method of starting an engine thereof.

BACKGROUND ART

FIG. 6 is a diagram showing the configuration of a dynamometer system 100. The dynamometer system 100 includes: an engine E which serves as a test piece; a dynamometer D which serves as a power absorbing member; a coupling shaft S which couples the engine E and the dynamometer D together; an engine control device 120 which controls the engine E through a throttle actuator 110; a dynamo control device 140 which controls the dynamometer D through an inverter 130; an encoder 150 which detects the rotation speed of the output shaft of the dynamometer D; and a shaft torque meter 160 which detects shaft torque (torsion torque) in a coupling portion of the coupling shaft S and the output shaft of the dynamometer D.

The engine control device 120 controls the output of the engine E in a form which is previously determined for each test item, and the dynamo control device 140 controls the rotation speed of the dynamometer D and torque based on the outputs of the encoder 150 and the shaft torque meter 160 and the like (see, for example, Patent Document 1).

Incidentally, in the dynamometer system 100 as described above, when the engine speed at the time of start of the engine is controlled to correspond to the engine speed at the time of start of the engine alone, it is necessary to perform the control so as to achieve a no-load state where the coupling shaft S and the dynamometer D are not connected when seen from the engine E. Patent Document 2 discloses a dynamo control device which performs control such that torsion torque in a coupling shaft S between an engine E and a dynamometer D is 0 [Nm] and which thereby realizes such a no-load state.

Patent Document 1: Japanese Unexamined Patent Application, Publication No. 2003-149085
Patent Document 2: Japanese Unexamined Patent Application, Publication No. 2015-075361

DISCLOSURE OF THE INVENTION

Problems to be Solved by the Invention

In the invention of Patent Document 2, H∞ control and a μ design method are applied to the design of the dynamo control device, and thus a resonance phenomenon which occurs at a predetermined machine resonant frequency (several tens of Hz or more in a high-rigidity dynamometer system) is reduced. Hence, in the dynamo control device of Patent Document 2, at the design stage thereof, it is necessary to identify not only physical amounts specific to a system such as the inertia of the dynamometer and the rigidity of the coupling shaft but also the inertia of the engine serving as a test piece. Hence, when the engine which is installed in the system for the first time is used as the test piece, a test for identifying the inertia thereof cannot be performed with the dynamo control device described above.

FIGS. 7 to 9 show response waveforms of the engine speed and shaft torque at the time of start when without use of the dynamo control device as described above, that is, while a torque current command signal is set to 0 [Nm] and a dynamometer in an uncontrolled state is connected to the engine, the engine is started with a power generation source (for example, a cell motor attached to the engine) other than the dynamometer. FIGS. 7, 8 and 9 show results obtained by using the engine whose inertia is 0.1 [kg·m$^2$], the engine whose inertia is 0.3 [kg·m$^2$] and the engine whose inertia is 0.5 [kg·m$^2$], respectively. In the following description, the "engine alone" refers to a waveform of the engine speed when the engine is started in a state where the dynamometer and the engine are separated from each other.

As shown in FIGS. 7 to 9, when the dynamometer in the uncontrolled state is connected, the engine speed is lowered as compared with the case of the engine alone. This is because the inertia of the dynamometer needs to be undertaken by the cell motor and the engine, and thus this is not preferable. As shown in FIGS. 7 to 9, when the dynamometer in the uncontrolled state is connected, a torsion resonance phenomenon occurs near the resonant frequency described above, and thus the shaft torque significantly oscillates, with the result that this is not preferable.

Hence, it is desired to provide a dynamo control device and a method of starting an engine which can realize a no-load state while appropriately reducing the occurrence of a resonance phenomenon even when the engine whose inertia is unknown is connected.

An object of the present invention is to provide a dynamo control device in a dynamometer system and a method of starting an engine thereof which can realize a no-load state while appropriately reducing the occurrence of a resonance phenomenon even when the engine whose inertia is unknown is connected.

Means for Solving the Problems (1) A dynamometer system (for example, a dynamometer system 1 which will be described later) includes a dynamometer (for example, a dynamometer D which will be described later) that is coupled to an output of an engine (for example, an engine E which will be described later) serving as a test piece with a shaft (for example, a coupling shaft S which will be described later), a torque detector (for example, a shaft torque meter 7 which will be described later) that detects torsion torque in the shaft and an inverter (for example, an inverter 3 which will be described later) that supplies power to the dynamometer. A dynamo control device (for example, a dynamo control device 6 which will be described later) generates a torque current command signal for the inverter based on a torque detection signal of the torque detector and a torque command signal corresponding to a command for the torque detection signal. The dynamo control device includes: a gain calculation unit (for example, a gain calculation unit 62 which will be described later) which multiplies a difference (for example, a shaft torque difference which will be described later) between the torque command signal and the torque detection signal by a predetermined gain (for example, a first gain wATR and a second gain Ki which will be described later); an integration operation unit (for example, an integration operation unit 63 which will be described later) which integrates an output signal of the gain calculation unit; a high-pass filter (for example, a high-pass filter 64 which will be described later) which is characterized by a predetermined response frequency; and a torque current command signal generation unit (for example, a torque current command signal generation unit 65 which will be described later) which generates the torque current command signal by superimposing, on an output signal of the integration operation unit, an output signal obtained by inputting the torque detection signal to the high-pass filter.

(2) In this case, the gain calculation unit preferably multiplies the difference between the torque command signal and the torque detection signal by a first gain and a second gain.

(3) In this case, the first gain is preferably set to a value which is substantially equal to the response frequency.

(4) In this case, the second gain is preferably set to a value calculated by use of a design value of inertia of the dynamometer and an upper limit value and a lower limit value of inertia of the test piece.

(5) In a method of starting an engine of a dynamometer system, while the torque current command signal in which the torque command signal is set to 0 and which is generated with the dynamo control device according to any one of (1) to (4) is being input to the inverter, a motor other than the dynamometer is used so as to start the engine.

Effects of the Invention (1) In the present invention, a difference between a torque command signal and a torque detection signal is multiplied by a predetermined gain, and this is further integrated so as to generate a torque current command signal, with the result that it is possible to perform control such that the torque detection signal follows the torque command signal. Hence, in the present invention, the torque command signal is set to 0, and thus even when an engine whose inertia is unknown is connected as a test piece, it is possible to start the engine while easily realizing a no-load state. In the present invention, on a signal obtained by the integration operation as described above, an output signal obtained by inputting the torque detection signal to a high-pass filter is superimposed, and thus a torque current command signal is generated, with the result that it is possible to reduce torsion resonance in a shaft which connects a dynamometer and the test piece together. In the dynamo control device of the present invention, the values of a gain in a gain multiplication portion and a response frequency in the high-pass filter need to be set. However, even when as the values of these parameters, a rough resonant frequency of the entire system and a value identified from a range of the inertia are used, sufficient effects are achieved, with the result that it is not necessary to identify the inertia of the engine previously and accurately.

(2) In the present invention, the difference between the torque command signal and the torque detection signal is multiplied by two gains, and thus it is possible to reflex, on the first and second gains, a rough value of the inertia of the test piece, a rough value of a resonant frequency in a machine system in which the test piece and the dynamometer are coupled with the shaft and the like such that the occurrence of a resonance phenomenon is sufficiently reduced.

(3) In the present invention, the first gain is set to a value which is substantially equal to the response frequency in the high-pass filter, and thus it is possible to easily perform the setting of the first gain and effectively reduce torsion torque.

(4) In the present invention, the second gain is set to a value calculated by use of a design value of the inertia of the dynamometer which is known and an upper limit value and a lower limit value of the inertia of the test piece which can be identified as rough values but which are unknown, and thus it is possible to easily perform the setting of the second gain and effectively reduce torsion torque.

(5) In a method of starting an engine according to the present invention, while the torque current command signal obtained by inputting the torque command signal whose value is 0 to the dynamo control device as described above is being input to the inverter, a motor other than the dynamometer is used so as to start the engine. In this way, even when the engine which is installed for the first time is used as the test piece, torsion torque can be reduced, and the engine can be started in the no-load state when seen from the engine.

PREFERRED MODE FOR CARRYING OUT THE INVENTION

Figure 1:
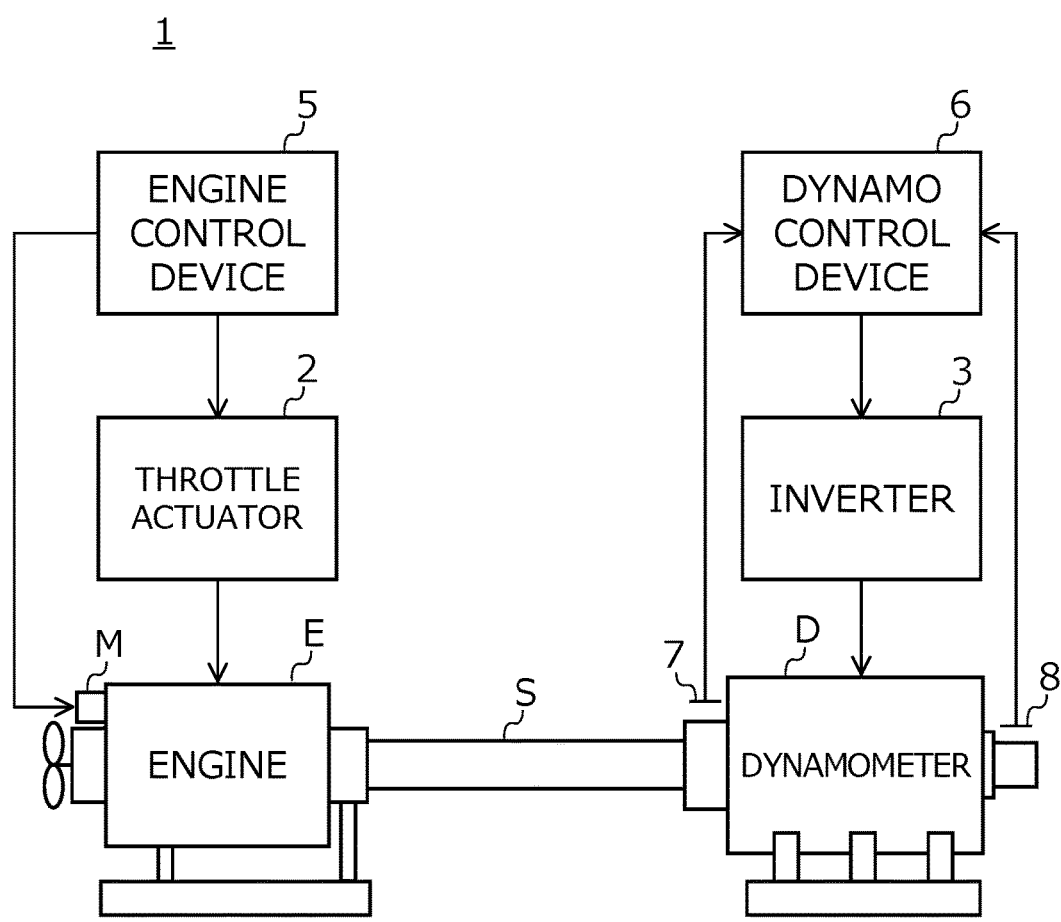
FIG. 1 is a diagram showing the configuration of a dynamometer system using a dynamo control device according to an embodiment of the present invention.

An embodiment of the present invention will be described in detail below with reference to drawings. FIG. 1 is a diagram showing the configuration of a dynamometer system 1 using a dynamo control device 6 according to the present embodiment. The dynamometer system 1 includes: an engine E which serves as a test piece; a dynamometer D which is coupled through a coupling shaft S to a crankshaft that is an output shaft of the engine E; an engine control device 5 which controls the engine E through a throttle actuator 2 and a cell motor M; an inverter 3 which supplies power to the dynamometer D; a dynamo control device 6 which controls the dynamometer D through the inverter 3; a shaft torque meter 7 which detects torsion torque in the coupling shaft S; and an encoder 8 which detects the rotation speed of the dynamometer D.

As the coupling shaft S, a machine component, such as a clutch, a transmission or a propeller shaft, which is to be installed in a vehicle together with the engine E may be used or a high-rigidity test shaft which is prepared separately from these machine components may be used.

The shaft torque meter 7 detects torsion torque acting on a portion of the coupling shaft S extending from the engine E to the dynamometer D which is closer to the dynamometer D than to the engine E from, for example, the amount of distortion in the direction of torsion of the coupling shaft S, and transmits a signal substantially proportional to a detection value to the dynamo control device 6.

The engine control device 5 drives the cell motor M with predetermined timing so as to start the engine E, then drives the throttle actuator 2 in a predetermined form and controls the output of the engine E.

The dynamo control device 6 generates a torque current command signal corresponding to a torque value to be generated in the dynamometer D based on the detection signal of the shaft torque meter 7, a detection signal of the encoder 8 and the like such that power generated in the engine E is absorbed in a predetermined form, and inputs the torque current command signal to the inverter 3.

In the dynamometer system 1, while the degree of throttle opening of the engine E is being controlled with the engine control device 5, the dynamo control device 6 is used to control the torque and the speed of the dynamometer D, and thus (1) the start of the engine E, (2) the measurement of the inertia moment of the engine E, (3) the evaluation tests of the durability, the fuel consumption, the exhaust purification performance and the like in the engine E and the like are performed. In particular, a configuration for realizing functions on (1) the start of the engine E among various functions realized by the dynamometer system 1 will be mainly described in detail below.

Figure 2:
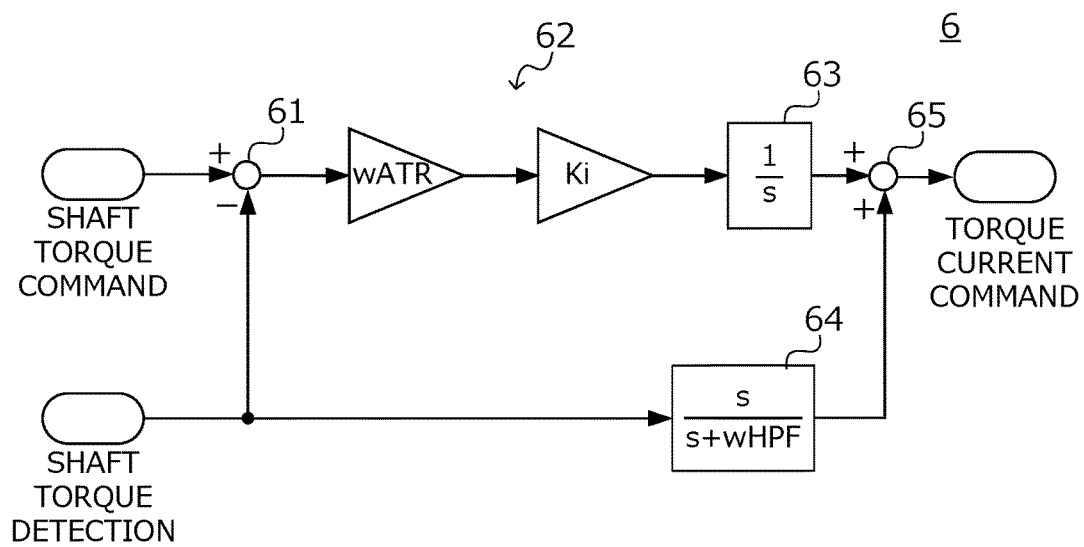
FIG. 2 is a diagram showing the configuration of a control circuit in the dynamo control device.

FIG. 2 is a diagram showing the configuration of a control circuit in the dynamo control device 6 according to the present embodiment. The control circuit shown in FIG. 2 is a control circuit which is preferably used in particular when the engine that is installed in the dynamometer system for the first time is started. A method of starting the engine with the control circuit of FIG. 2 will be described later.

The dynamo control device 6 includes a differential calculation unit 61, a gain calculation unit 62, an integration operation unit 63, a high-pass filter 64 and a torque current command signal generation unit 65.

The differential calculation unit 61 calculates a difference between the torque detection signal of the shaft torque meter and a torque command signal which corresponds to a command for the torque detection signal and which is determined by unillustrated processing (which is the torque command signal−the torque detection signal, and which is also referred to as a "shaft torque difference" in the following description).

The gain calculation unit 62 multiplies the shaft torque difference calculated by the differential calculation unit 61 by a first gain wATR for determining control responsiveness and a second gain Ki for determining control stability.

Here, the value of the first gain wATR is determined based on a rough value of a resonant frequency in a machine system including the engine and the dynamometer. More specifically, the value of the first gain wATR is set to about one tenth of the resonant frequency (about several tens of Hz) in the machine system described above.

The value of the second gain Ki is determined based on the value of the inertia moment of the dynamometer which is known, a rough value of the inertia moment of the engine which is unknown and the like. More specifically, the value of the second gain Ki is set to a value calculated by formula below by use of a lower limit value J1a and an upper limit value J1b in a range assumed to be the inertia moment of the engine installed as the test piece and a design value J2 of the inertia moment of the dynamometer which is known.

$$Ki = \sqrt{\frac{J1a + J2}{J1a} \cdot \frac{J1b + J2}{J1b}} \quad (1)$$

The integration operation unit 63 calculates the integral value of the shaft torque difference multiplied by the two gains wATR and Ki so as to calculate an integral operation amount.

The high-pass filter 64 is a filter which is characterized by a predetermined response frequency wHPF, and passes, from the torque detection signal of the shaft torque meter, only a component on a high-frequency side with respect to the response frequency wHPF and attenuates a component on a low-frequency side. As the transfer function GHPF(s) of the high-pass filter 64, for example, a formula below is used. In the formula below, s represents a Laplace operator. Here, the value of the response frequency wHPF is determined based on, for example, the same value as the first gain wATR or the rough value of the resonant frequency in the machine system including the engine and the dynamometer described previously.

$$GHPF(s) = \frac{s}{s + wHPF} \quad (2)$$

The torque current command signal generation unit 65 generates the torque current command signal by superimposing, on the integral operation amount calculated by the integration operation unit 63, an output signal obtained by inputting the torque detection signal to the high-pass filter 64.

With reference back to FIG. 1, the method of starting the engine E with the control circuit of FIG. 2 in the dynamometer system 1 will be described. In the dynamometer system 1, when the engine E where the value of the inertia moment thereof is not specifically identified is started for the first time, while the torque current command signal generated by inputting the torque command signal set to 0 [Nm] and the torque detection signal of the shaft torque meter 7 to the dynamo control device 6 of the control circuit shown in FIG. 2 is being inputting to the inverter 3, the engine control device 5 and the cell motor M are used to start the engine E (so-called cranking).

Figure 3:
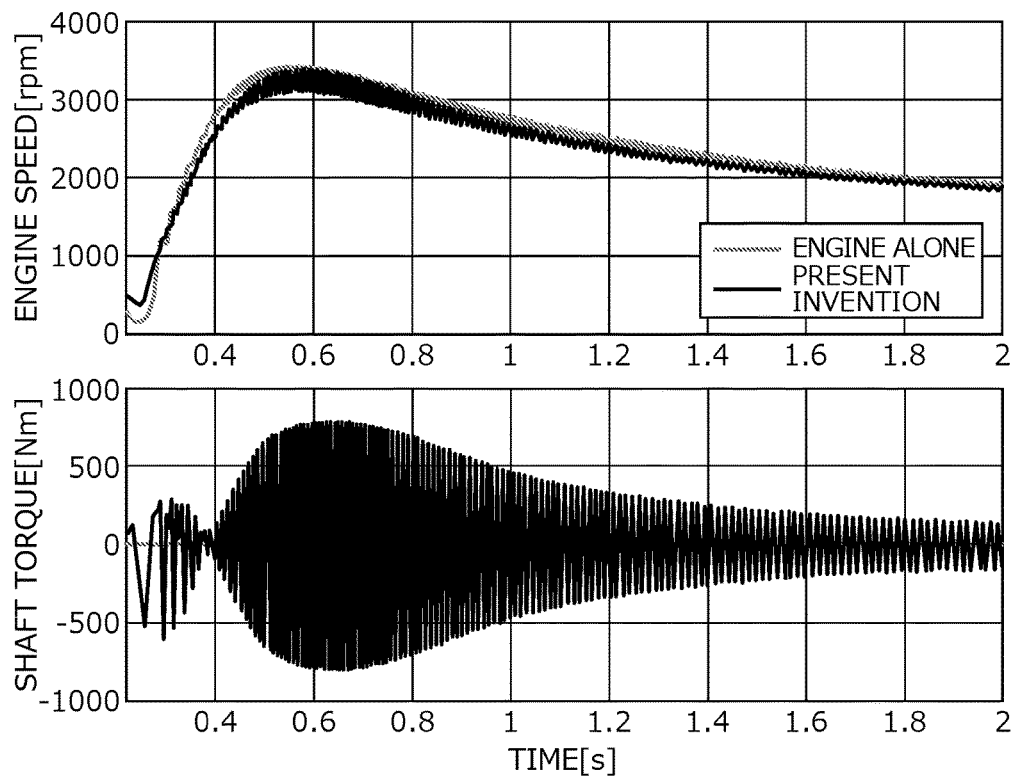
FIG. 3 is a diagram showing response waveforms of the engine speed and shaft torque when the engine is started by a method of starting the engine according to the present embodiment (engine inertia=0.1 [kg·m$^2$])
Figure 4:
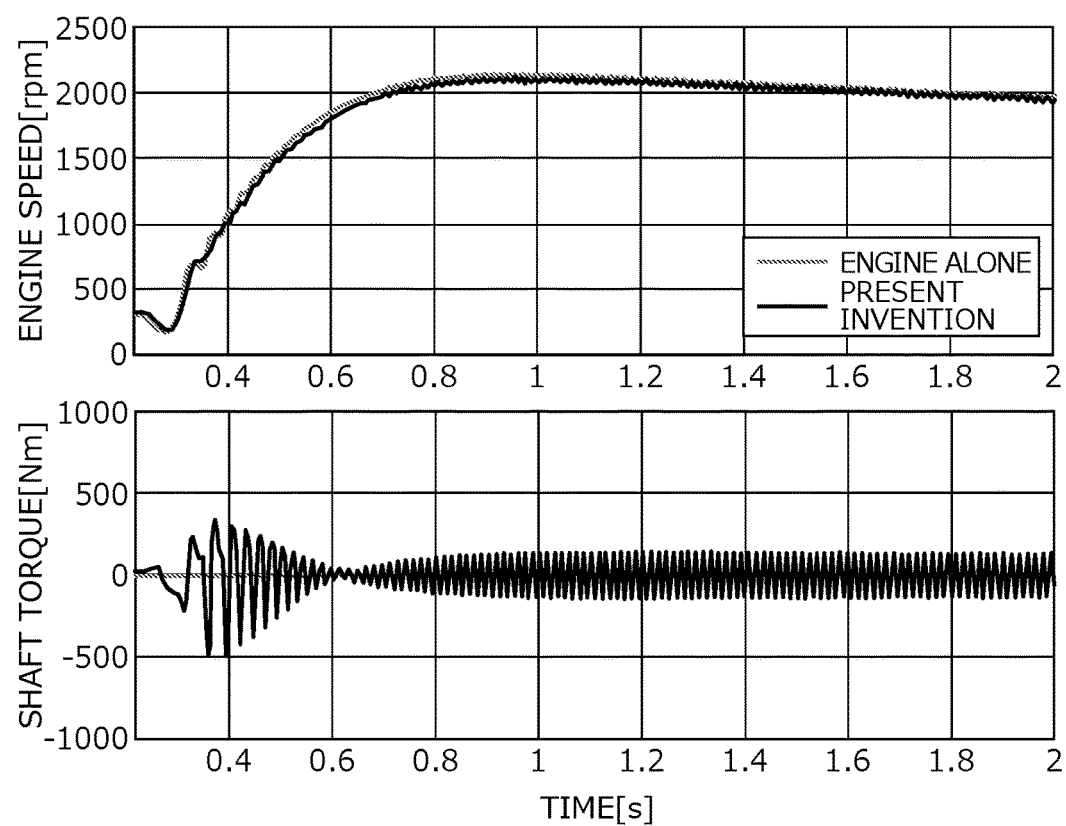
FIG. 4 is a diagram showing response waveforms of the engine speed and the shaft torque when the engine is started by the method of starting the engine according to the present embodiment (engine inertia=0.3 [kg·m$^2$])
Figure 5:
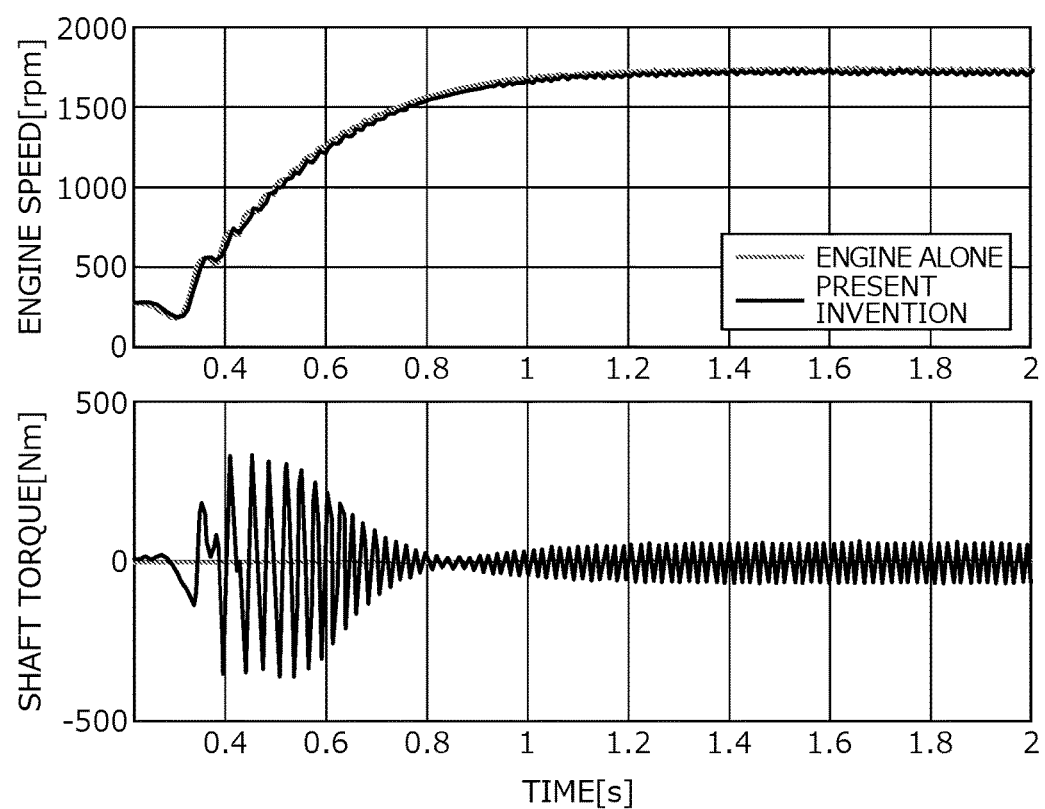
FIG. 5 is a diagram showing response waveforms of the engine speed and the shaft torque when the engine is started by the method of starting the engine according to the present embodiment (engine inertia=0.5 [kg·m$^2$])
Figure 6:
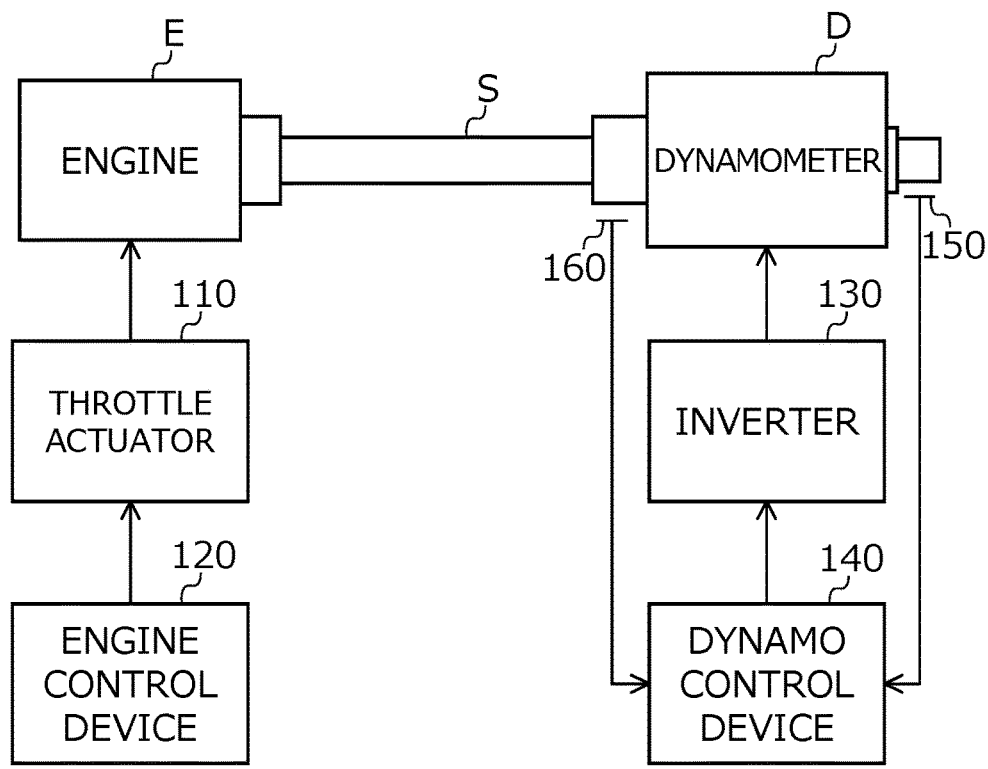
FIG. 6 is a diagram showing the configuration of a dynamometer system.

FIGS. 3 to 5 show response waveforms of the engine speed and shaft torque at the time of start when the engine E is started by the method of starting the engine described above.

FIGS. 3, 4 and 5 show results obtained by using the engine whose inertia is 0.1 [kg·m$^2$], the engine whose inertia is 0.3 [kg·m$^2$] and the engine whose inertia is 0.5 [kg·m$^2$], respectively.

In order for the results of FIGS. 3 to 5 to be obtained, the values of a plurality of parameters (wATR, Ki and wHPF) defined in the control circuit of the dynamo control device are set as below with the assumption that the resonant frequency of the machine system and the inertia moment of the engine are unknown. Specifically, the first gain wATR and the response frequency wHPF are assumed to be equal to each other (wATR=wHPF). As the specific values thereof, based on the experience that the resonant frequency is roughly several tens of Hz, it is assumed that wATR=wHPF=2×π×5 [rad/s]. Based on the experience that the inertia moment of the engine is within about 0.1 to 0.5 [kg·m$^2$], the value of the second gain Ki is set based on formula (1) above. More specifically, with the assumption that J1a=0.1 [kg·m$^2$], J1b=0.5 [kg·m$^2$] and J2=0.12 [kg·m$^2$], Ki=1.65.

Figure 7:
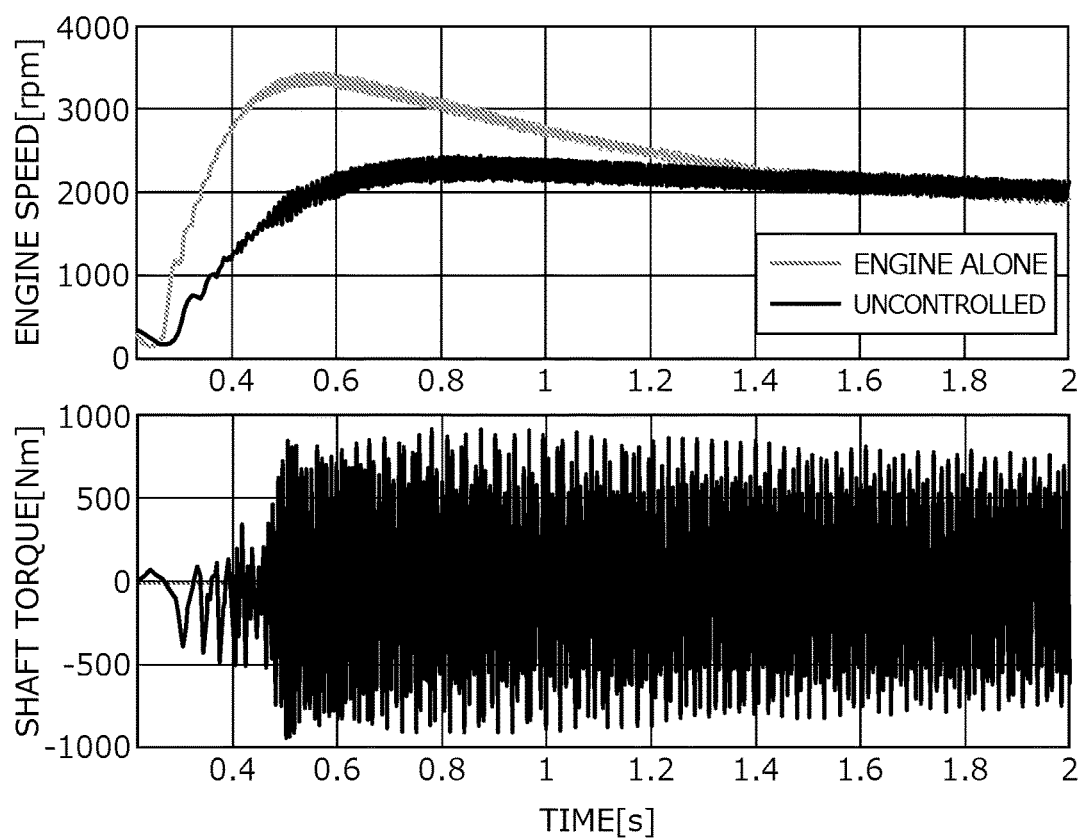
FIG. 7 is a diagram showing response waveforms of the engine speed and shaft torque at the time of start when the engine is started while a dynamometer in an uncontrolled state is being connected to the engine (engine inertia=0.1 [kg·m$^2$])
Figure 8:
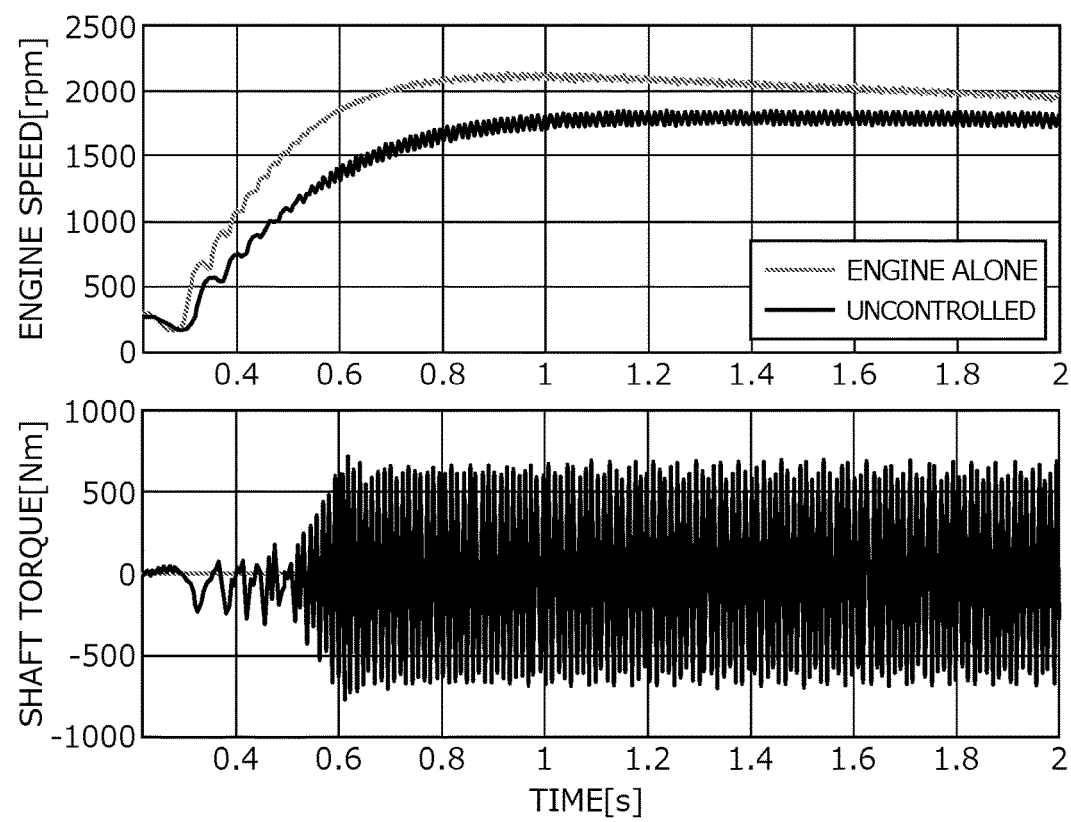
FIG. 8 is a diagram showing response waveforms of the engine speed and the shaft torque at the time of start when the engine is started while the dynamometer in the uncontrolled state is being connected to the engine (engine inertia=0.3 [kg·m$^2$])
Figure 9:
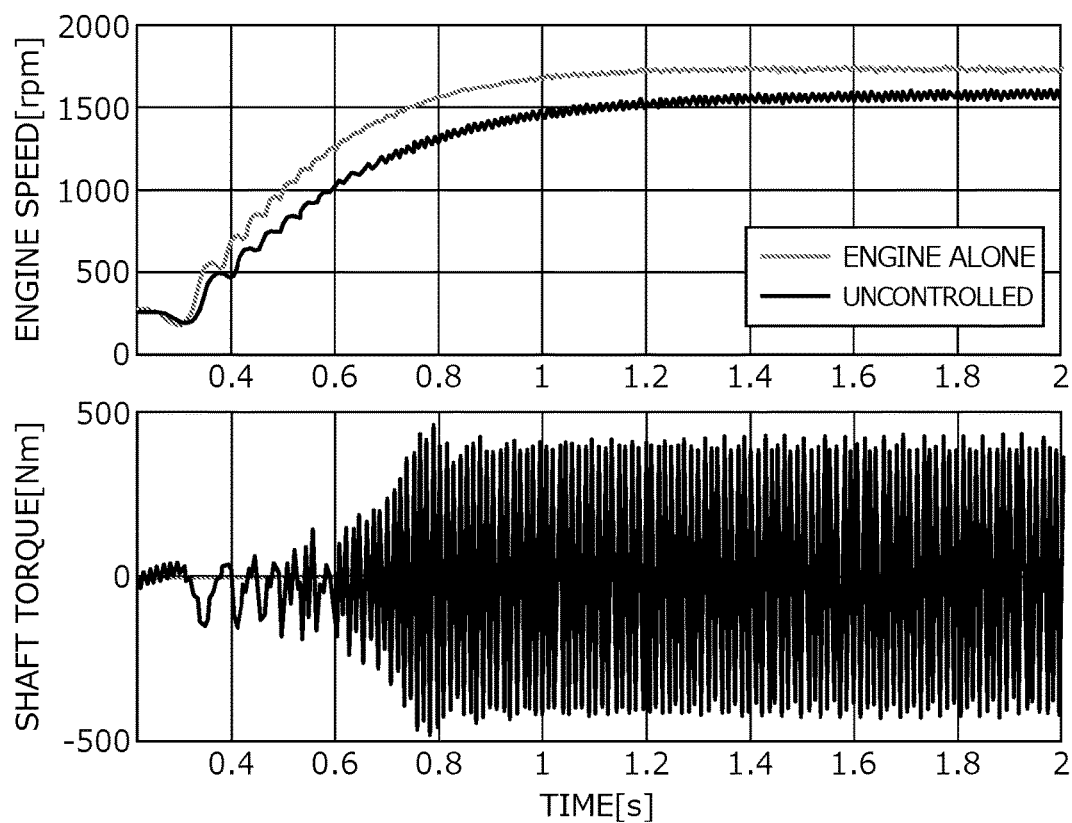
FIG. 9 is a diagram showing response waveforms of the engine speed and the shaft torque at the time of start when the engine is started while the dynamometer in the uncontrolled state is being connected to the engine (engine inertia=0.5 [kg·m$^2$]).

As is clear from comparison between the results of FIGS. 3 to 5 (the case where the dynamo control device of FIG. 2 is used) and the results of FIGS. 7 to 9 (the case where the dynamometer is brought into the uncontrolled state), in the present invention, though the engine and the dynamometer are connected with the coupling shaft, the engine speed at the time of start is substantially equal to that in the case of the engine alone. In the present invention, the torsion resonance in the coupling shaft which connects the engine and the dynamometer together is reduced, and the value thereof is controlled to be about 0 [Nm]. Specifically, the dynamo control device of FIG. 2 is used, and thus even when the value of the inertia moment of the engine cannot be previously grasped accurately, it is possible to obtain startability substantially equivalent to the engine alone while the no-load state is being realized (in other words, the inertia of the dynamometer is undertaken by the engine).

EXPLANATION OF REFERENCE NUMERALS

1: dynamometer system
3: inverter
6: dynamo control device
62: gain calculation unit
63: integration operation unit
64: high-pass filter
65: torque current command signal generation unit
7: shaft torque meter (torque detector)
D: dynamometer
E: engine (test piece)
S: coupling shaft (shaft)

The invention claimed is:

1. A dynamo control device for a dynamometer system, the dynamometer system including a dynamometer that is coupled to an output of an engine serving as a test piece with a shaft, a torque detector that detects torsion torque in the shaft and an inverter that supplies power to the dynamometer, the dynamo control device generating a torque current command signal for the inverter based on a torque detection signal of the torque detector and a torque command signal corresponding to a command for the torque detection signal, the dynamo control device comprising:
a gain calculation unit which multiplies a difference between the torque command signal and the torque detection signal by a predetermined gain;
an integration operation unit which integrates an output signal of the gain calculation unit;
a high-pass filter that passes only a component on a high-frequency side with respect to a predetermined response frequency and attenuates a component on a low-frequency side with respect to the response frequency; and
a torque current command signal generation unit which generates the torque current command signal by superimposing, on an output signal of the integration operation unit, an output signal obtained by inputting the torque detection signal to the high-pass filter.

2. The dynamo control device of the dynamometer system according to claim 1, wherein the gain calculation unit multiplies the difference between the torque command signal and the torque detection signal by a first gain that is a constant having a frequency dimension and a second gain that is a dimensionless constant.

3. The dynamo control device of the dynamometer system according to claim 2, wherein the first gain is set to a value which is substantially equal to the response frequency.

4. A method of starting an engine of a dynamometer system, wherein while the torque current command signal in which the torque command signal is set to 0 and which is generated with the dynamo control device according to claim 3 is being input to the inverter, a motor other than the dynamometer is used so as to start the engine.

5. The dynamo control device of the dynamometer system according to claim 3, wherein the second gain is set to a value calculated by use of a design value of inertia of the dynamometer and an upper limit value and a lower limit value of inertia of the test piece.

6. The dynamo control device of the dynamometer system according to claim 2, wherein the second gain is set to a value calculated by use of a design value of inertia of the dynamometer and an upper limit value and a lower limit value of inertia of the test piece.

7. A method of starting an engine of a dynamometer system, wherein while the torque current command signal in which the torque command signal is set to 0 and which is generated with the dynamo control device according to claim 6 is being input to the inverter, a motor other than the dynamometer is used so as to start the engine.

8. A method of starting an engine of a dynamometer system, wherein while the torque current command signal in which the torque command signal is set to 0 and which is generated with the dynamo control device according to claim 2 is being input to the inverter, a motor other than the dynamometer is used so as to start the engine.

9. A method of starting an engine of a dynamometer system, wherein while the torque current command signal in which the torque command signal is set to 0 and which is generated with the dynamo control device according to claim 1 is being input to the inverter, a motor other than the dynamometer is used so as to start the engine.

* * * * *